United States Patent [19]

Murofushi et al.

[11] Patent Number: 4,565,860

[45] Date of Patent: Jan. 21, 1986

[54] POLYMER OF TRIPHENYLAMINE

[75] Inventors: Yasuyuki Murofushi, Yokohama; Masazumi Ishikawa, Yokosuka; Mikio Kawai, Yokohama, all of Japan

[73] Assignee: Nissan Motor Co., Ltd., Yokohama, Japan

[21] Appl. No.: 719,461

[22] Filed: Apr. 3, 1985

[30] Foreign Application Priority Data

Apr. 9, 1984 [JP] Japan .................................. 59-68986
Apr. 9, 1984 [JP] Japan .................................. 59-68987
Jul. 18, 1984 [JP] Japan ................................ 59-148868

[51] Int. Cl.$^4$ ............................................ C08G 73/02
[52] U.S. Cl. ..................................... 528/422; 252/500; 528/210
[58] Field of Search ................ 528/422, 210; 252/500

[56] References Cited

PUBLICATIONS

Yamamoto et al., "A Novel Type of Polycondensation Utilizing Transition Metal–Catalyzed C–C Coupling", Bulletin of the Chemical Society of Japan, vol. 51, (7), 1978, pp. 2091–2097.

*Primary Examiner*—Harold D. Anderson
*Attorney, Agent, or Firm*—Schwartz, Jeffery, Schwaab, Mack, Blumenthal & Evans

[57] ABSTRACT

A novel polymer of triphenylamine, which may be a homopolymer of 4,4',4"-triphenylamine units, a copolymer of 4,4',4"-triphenylamine units and 1,4-benzene units or a homopolymer of 4,4'-(4"-unsubstituted or 4"-alkyl or alkoxyl) triphenylamine. This polymer is prepared by first carrying out Grignard reaction between a halogenotriphenylamine and metallic magnesium and then polymerizing the obtained Grignard reagent in a nonreactive organic solvent by using a nickel compound catalyst. This polymer acquires high conductivity by doping with an electron accepting dopant, and the conductivity is stable in the atmosphere. This polymer is useful as an electrode material in a device using a liquid electrolyte and is advantageous in being stable to repetition of electrochemical oxidation and reduction.

7 Claims, 15 Drawing Figures

POLYMER OF TRIPHENYLAMINE

BACKGROUND OF THE INVENTION

This invention relates to a novel polymer of triphenylamine, which acquires high and stable electroconductivity by doping with an electron acceptor.

Among known electroconductive resins not using carbon or metal fillers, polyacetylene resin is relatively high in conductivity. However, practical application of this electroconductive resin encounters problems such as the toxicity of arsenic pentafluoride used as dopant and susceptibility of polyacetylene to air oxidation with serious and irremediable lowering of the conductivity. Poly(paraphenylene) also provides an electroconductive resin fairly high in conductivity. However, this resin is easily hydrogenated by the moisture contained in the atmosphere and, as a result, undergoes serious and irremediable lowering of the conductivity. Electroconductive poly(paraphenylene sulfide) resin is also known, but the electroconductive property of this resin is not sufficiently stable in the atmosphere.

SUMMARY OF THE INVENTION

It is an object of the present invention to provide a novel polymer which acquires high electroconductivity when doped with an electron acceptor and is stable in the atmosphere.

It is another object of the invention to provide an electroconductive polymeric material in which a polymer according to the invention is used as a basic material.

The present invention provides a polymer comprising structural units represented by the formula (I):

(I)

This polymer may be either a homopolymer of 4,4',4''-triphenylamine or a copolymer of 4,4',4''-triphenylamine and benzene, i.e. a polymer comprising structural units of the formula (I) and second structural units represented by the formula (II).

(II)

Furthermore, this invention provides a polymer comprising structural units represented by the general formula (III):

(III)

wherein R represents a hydrogen atom, an alkyl group having 1 to 4 carbon atom(s) or an alkoxyl group having 1 to 4 carbon atom(s).

Usually the last mentioned polymer is a homopolymer.

In every case a polymer of the invention is a nonconductive material, but the polymer acquires high conductivity by doping with an electron accepting dopant such as a halogen or a halide. An important advantage of the invention resides in that the conductivity of the doped polymer is stable in the atmosphere. Besides the uses as conductors, a polymer of the invention is useful as an organic electrode in a device using an electrolyte liquid. When a polymer of the invention is electrochemically doped with anions, the nitrogen atoms in the polymer are positively charged and assume a stable state. Owing to this property the polymer acquires high conductivity and, as a matter of great importance for an electrode material, is very stable to the repetition of electrochemical oxidation and reduction. This is also an important advantage of the invention since known conductive resins such as polyacetylene and poly(paraphenylene) undergo rapid deterioration when subjected to repeated electrochemical oxidation and reduction.

A polymer of the invention can be prepared by first carrying out a Grignard reaction between a halogenotriphenylamine and metallic magnesium and then polymerizing the obtained Grignard reagent in a nonreactive organic solvent by using a nickel compound catalyst.

DESCRIPTION OF THE PREFERRED EMBODIMENTS

Polymers according to the invention are novel polymeric compounds. These polymers can be prepared by application of known reactions including the Grignard reaction. Metallic magnesium in active state for use in the Grignard reaction can be obtained by the well known reaction represented by the equation (1).

$$2K + MgCl_2 \rightarrow Mg + 2KCl \quad (1)$$

In preparing a polymer comprising structural units of the above defined formula (I), the starting monomer is a 4,4′,4″-trihalogenotriphenylamine such as 4,4′,4″-tribromotriphenylamine or 4,4′,4″-trichlorotriphenylamine. The Grignard reaction of the monomer with magnesium is represented by the equation (2), wherein X represents a halogen atom.

The right-hand term of the equation (2) indicates that only a half of the monomer molecules turn into a Grignard reagent, but this is not limitative. Other types of intermediate states are also possible insofar as the balance of magnesium is kept. The polymerization of the thus modified monomer is represented by the equation (3).

Polymerization reactions in which a Grignard reagent is used as an intermediate state and in which linking takes place at the halogen-substituted positions are described in Bull. Chem. Soc. Japan, 51, 2091 (1978) and Japanese patent application publication No. 58-46268 (1983).

The above reactions (1), (2) and (3) are carried out in a nonreactive organic solvent, which is usually an ether such as diethyl ether, dibutyl ether or tetrahydrofuran.

As the catalyst for the polymerization reaction (3), it is suitable to use a nickel compound such as nickel dichloride, nickel dibromide, dichloro(2,2'-bipyridine)nickel, dibromo-bis-(triphenylphosphine)nickel or 1,5-cyclooctadiene-bis-(triphenylphosphine)nickel.

In the case of preparing a copolymer of triphenylamine and benzene, a 1,4-dihalogenobenzene such as 1,4-dibromobenzene or 1,4-dichlorobenzene is introduced into the reaction system after carrying out the Grignard reaction of the equation (2). Usually this copolymer is an alternating copolymer.

A polymer comprising the structural units represented by the above defined general formula (III) can be prepared by fundamentally the same method. In this case, the starting monomer is either a 4,4'-dihalogenotriphenylamine or a 4,4'-dihalogeno-4''-alkyl(or 4''-alkoxy)triphenylamine such as 4,4'-dibromo-(4''-methyl)triphenylamine or 4,4'-dibromo-(4''-methoxy)triphenylamine. In this case the polymerization reaction after the Grignard reaction is represented by the equation (4), wherein X is a halogen atom and R is an alkyl group having 1 to 4 carbon atom(s) or an alkoxyl group having 1 to 4 carbon atom(s).

The catalyst and nonreactive solvent for this polymerization reaction are as described hereinbefore with respect to the reaction of the equation (3).

Usually a polymer of the invention has 5 to 100 molecules of triphenylamine.

As will be understood from the above description of the preparation method, a polymer of the invention may contain some halogen atoms in the state of substituents for some hydrogen atoms of the terminal phenylene groups.

A dopant for use in a polymer of the invention as an electroconductive polymer can be selected from various kinds of electron accepting substances. Examples are halogens and halogen compounds such as iodine, bromine and bromine iodide, metal halides such as arsenic pentafluoride, phosphorus pentachloride, phosphorus pentafluoride, antimony pentafluoride, silicon tetrafluoride, aluminum chloride, aluminum bromide, aluminum fluoride and ferric chloride, protonic acids such as sulfuric acid, nitric acid, and fluorosulfuric acid, oxidizers such as sulfur trioxide, nitrogen dioxide and difluorosulfonyl peroxide, and some other organic compounds such as tetracyanoquinodimethane and tetracyanoethylene.

When using a polymer of the invention as an electrode material in a device using an electrolyte liquid, the solvent of the electrolyte may be either water or an organic solvent such as propylene carbonate, tetrahydrofuran or γ-butyl lactone. Examples of suitable electrolyte materials are lithium perchlorate and lithium borofluoride.

In the case of electrochemically doping a polymer of the invention, the dopant is anion which may be selected from anions of halides of Group Va metals such as $PF_6^-$, $SbF_6^-$ and $AsF_6^-$, anions of halides of Group IIIa metals such as $BF_4^-$, halogen anions such as $I^-$ (or $I_3^-$), $Br^-$ and $Cl^-$, and perchlorate anion $ClO_4^-$.

A polymer of the invention can be press-shaped into desired forms either singly or mixed with suitable additives. A binder may be used in shaping this polymer. Examples of useful binders are poly(tetrafluoroethylene), poly(vinylidene fluoride) and polyethylene.

A polymer of the invention comprising the structural units of the general formula (III) is a thermoplastic material which fluidizes usually at 200°-250° C. Furthermore, this polymer is soluble in organic solvents such as chloroform and carbon disulfide. Accordingly this polymer is easy to form into various shapes. This is an important advantage of this polymer since most of known conductive resins not using carbon or metal fillers are hardly meltable and are insoluble in popular solvents.

The invention will further be illustrated by the following nonlimitative examples.

EXAMPLE 1

Using a 100 ml flask, 0.8 g (0.02 gram atom) of metallic potassium, 0.95 g (0.01 mole) of magnesium chloride and 50 ml of tetrahydrofuran were heated at reflux temperature in a nitrogen gas atmosphere for about 1 hr while continuing stirring. The reaction between potassium and magnesium chloride gave a black powder, which was confirmed to be metallic magnesium.

Then 3.2 g (0.067 mole) of 4,4',4''-tribromotriphenylamine was added to the mixture of tetrahydrofuran and metallic magnesium obtained by the above described reaction, and the resultant mixture was stirred and heated to carry out reflux. After the lapse of about 1 hr it was confirmed that almost the entire quantity of metallic magnesium had been consumed. Next, 10 mg of dichloro-bis-(2,2'-bipyridine)nickel was added as a polymerization catalyst to the reaction system, and stirring and heating for reflux were continued further. A polymerization reaction took place and proceeded smoothly with precipitation of a yellowish brown polymer. The polymerization reaction was carried out for about 2 hr. Then the entire quantity of the precipitate was put into ethanol containing a small amount of hydrochloric acid, and the mixture was stirred for 1 hr. After that the precipitate was separated by filtration and well washed with ethanol on the filter, and was purified by carrying out extraction of impurities with hot ethanol for 12 hr by using a Soxhlet's extractor. After drying the weight of the obtained polymer, viz. poly(4,4',4''-triphenylamine), was 1.9 g.

Figure 1:
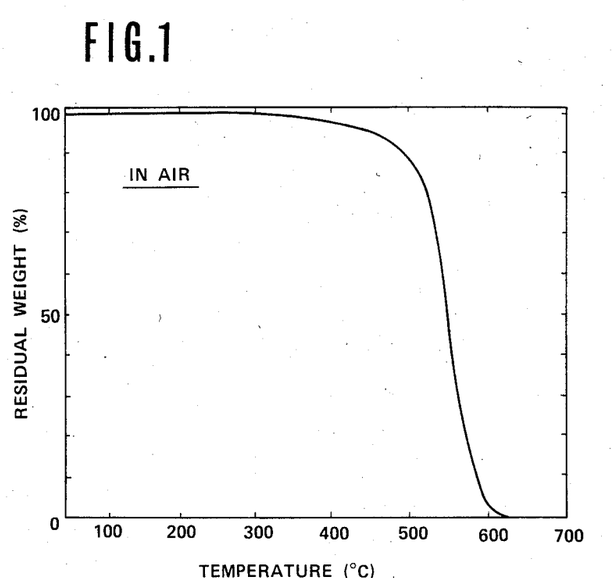
FIGS. 1 and 2 are graphs showing the results of thermogravimetric analysis of a polymer as a first example of the invention.
Figure 2:
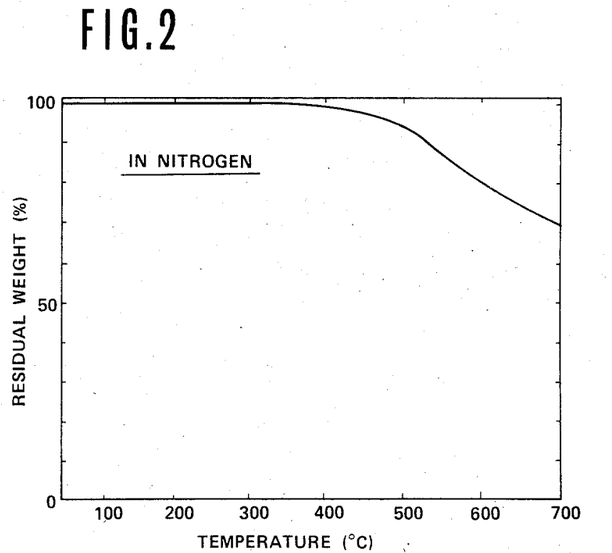

The polymer prepared in this manner was in the form of a yellow powder and was found to be very stable since no change was recognized after leaving the polymer powder standing in the atmosphere for two months. FIG. 1 shows the result of thermogravimetric analysis of this polymer in air and FIG. 2 the result of the same analysis in nitrogen gas. As can be seen, this polymer exhibited practically no loss of weight until the temperature reached 300° C. even in air, and in nitrogen gas the change in weight was only about 30% when heated up to 700° C. Accordingly this polymer can be said to be very high in thermal stability.

Figure 3:
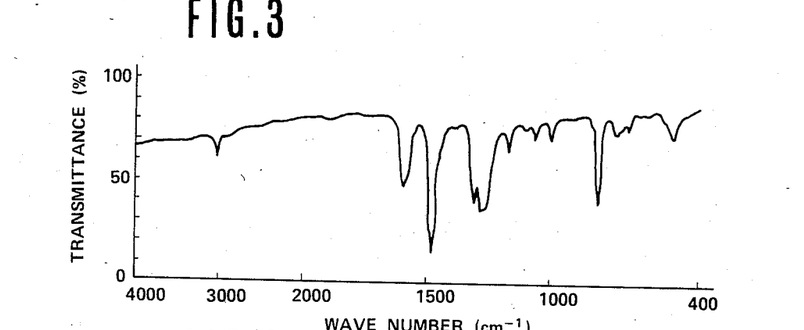
FIG. 3 is a chart showing the infrared absorption spectrum of the same polymer.

FIG. 3 shows the infrared absorption spectrum of this polymer. The strong absorption peaks at 1270 cm$^{-1}$, 1310 cm$^{-1}$, 1480 cm$^{-1}$ and 1590 cm$^{-1}$ are attributed to the triphenylamine structure, and the peak at about 820 cm$^{-1}$ indicates the existence of para-substituted benzene ring. Such a manner of infrared absorption evidences that the polymer consists of regularly repeating units which are represented by the formula (I) defined hereinbefore.

Elementary analysis of this polymer gave the following result: Carbon 71.5%, Hydrogen 4.3%, Nitrogen 4.4%, and Halogen 15.7%. This analytical result gives an empirical formula $C_{18}H_{12.9}N_{0.95}Br_{0.59}$, which is close to the theory $C_{18}H_{12}N$. In the empirical formula H is in excess by 0.9, and Br remains. Presumably these deviations from the theory are attributed to the state of the structural unit at the terminals of the polymer. The measurement of the molecular weight was impracticable because this polymer was insoluble in the commonly used solvents. Considering from the results of polymerization reactions of resembling compounds and also from the amounts of H and Br in this polymer, this polymer is presumed to have 10 to 15 molecules of triphenylamine.

Using the polymer of Example 1, the following experiments were conducted.

EXPERIMENT 1

Using a tabletting machine for infrared spectrophotometry, the polymer of Example 1 was formed into a tablet by application of a compression pressure of 8000 kg/cm$^2$. Small test pieces were cut out of the polymer tablet, and platinum wires were attached to two opposite ends of each test piece by using a conductive adhesive (ELECTRODAG of Acheson Colloids Co.).

At room temperature the conductivity of the test piece was measured to be $1.3 \times 10^{-9}$ S·cm$^{-1}$. This means that the polymer in the compressed state was an insulator. To dope the polymer with iodine, the same test piece was left exposed to saturated vapor of iodine at room temperature in the absence of air. The conductivity of the test piece became as high as 0.2 S·cm$^{-1}$ in 24 hr and further increased to 0.8 S·cm$^{-1}$ in one week, and the yellow color of the polymer changed to black. After that, the test piece doped with iodine was left in the atmospheric air to examine the manner of spontaneous dissipation of iodine. As the result, the test piece retained high conductivity for a long time though the conductivity decreased to 0.2 S·cm$^{-1}$ in one week and to 0.06 S·cm$^{-1}$ in 40 days. Next, the same test piece was left exposed to saturated vapor of iodine at room temperature in the presence of air. The conductivity of the test piece increased to 0.6 S·cm$^{-1}$ in 24 hr and resumed the highest level of 0.8 S·cm$^{-1}$ in 48 hr. Thus, the results of this experiment demonstrate that a polymer of the invention acquires high conductivity by suitable doping, that the high conductivity is practically stably retained while the polymer is exposed to air and that the conductivity does not irreversibly lower. Particularly in stableness of the conductivity, a polymer of the invention is advantageous over known conductive polymers such as polyacetylene and poly(paraphenylene).

EXPERIMENT 2

A test electrode was produced by first applying a very small quantity of a conductive adhesive (ELECTRODAG) to an end portion of a platinum wire and then attaching a small quantity of the poly(4,4',4''-triphenylamine) powder obtained in Example 1.

Figure 4:
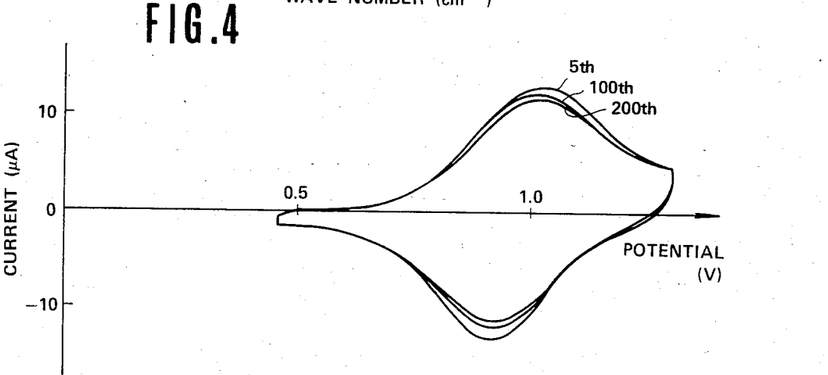
FIGS. 4 and 5 are cyclic voltamograms obtained in an experiment on the same polymer as an electrode in an electrolyte liquid.

In an electrolyte liquid prepared by dissolving 1 mole of lithium perchlorate in 1 liter of propylene carbonate, measurement of an oxidation-reduction potential of the test electrode was conducted in a nitrogen gas atmosphere by using a platinum electrode as the counter electrode and Ag/AgCl electrode as the reference electrode. The electrode potential was cyclically and repeatedly varied at a constant rate of 20 mV/sec. FIG. 4 shows a cyclic voltamogram obtained in this experiment. As can be seen, the oxidation-reduction potential of the tested polymer was about 0.98 V. Since there was little change in the potential-current relationship while the measurement was repeated 200 times, the tested polymer electrode could be judged very stable to repetition of oxidation and reduction.

Figure 5:
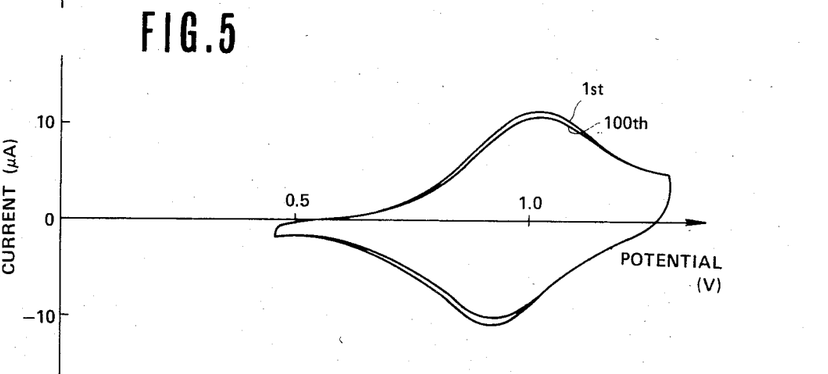

Next, the measurement of oxidation-reduction potential of the same test electrode was conducted in air. The electrolyte liquid and the counter and reference electrodes were as described above, and the potential was continuously varied at 20 mV/sec. FIG. 5 shows a cyclic voltamogram obtained in this case. From a comparison between FIGS. 4 and 5, it is understood that the tested polymer electrode is very stable to repetition of oxidation and reduction even when oxygen and moisture dissolve into the electrolyte liquid from the atmosphere.

EXAMPLE 2

First, metallic magnesium was formed by reaction between 0.8 g of metallic potassium and 0.95 g of magnesium chloride in 50 ml of tetrahydrofuran in the same manner as in Example 1.

Then, 1.6 g (0.033 mole) of 4,4',4''-tribromotriphenylamine was added to the mixture of tetrahydrofuran and metallic magnesium, and the resultant mixture was stirred and heated to carry out reflux. After the lapse of about 1 hr it was confirmed that almost the entire quantity of metallic magnesium had been consumed. Next, 1.8 g (0.05 mole) of 1,4-dibromobenzene was added to the reaction system, and stirring and heating for reflux were continued further. Then, 10 mg of dichloro-bis-(2,2'-bipyridine) nickel was added as a polymerization catalyst to the reaction system, and stirring and heating for reflux were resumed. A polymerization reaction took place and proceeded smoothly with precipitation of a yellowish brown polymer. The polymerization reaction was carried out for 2 hr. Then the entire quantity of the precipitate was put into ethanol containing hydrochloric acid, and the mixture was stirred for about 1 hr. After that the precipitate was washed and purified by the same process as in Example 1. After drying, the weight of the obtained copolymer of triphenylamine and benzene was 1.4 g.

The copolymer prepared in this manner was in the form of a yellow powder and was found to be very stable since no change was recognized after leaving the copolymer powder standing in the atmosphere for two months. The result of thermogravimetric analysis of this copolymer in air was practically identical with the curve of FIG. 1, and the result of the same analysis in nitrogen gas was practically identical with the curve in FIG. 2. Accordingly this copolymer can be judged very high in thermal stability.

Figure 6:
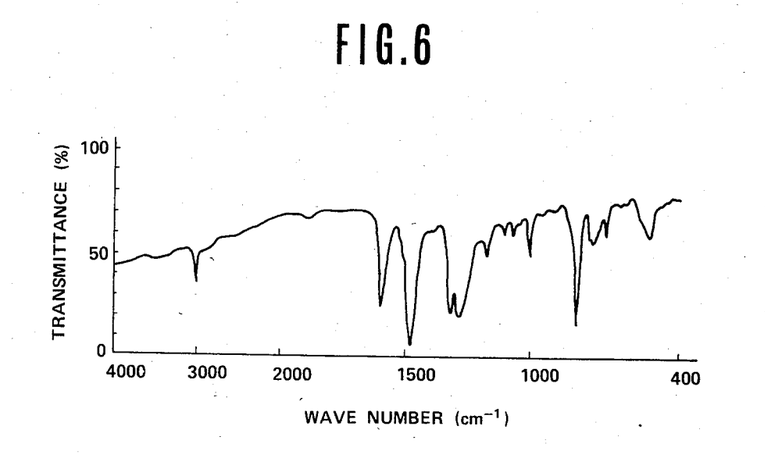
FIG. 6 is a chart showing the infrared absorption spectrum of a polymer as a second example of the invention.

FIG. 6 shows the infrared absorption spectrum of this copolymer. Almost similarly to the infrared absorption spectrum of FIG. 3 (homopolymer of triphenylamine), there are strong absorption peaks attributed to the triphenylamine structure and a peak indicative of the existence of para-substituted benzene ring. The chart of FIG. 6 evidences that the copolymer consists of regularly repeating units and has the repeating unit represented by the formula (II) defined hereinbefore.

Elementary analysis of this copolymer gave the following result: Carbon 75.7%, Hydrogen 4.8%, Nitrogen 3.1% and Halogen 7.2%. This analytical result gives an empirical formula $C_{27}H_{20.1}N_{0.96}Br_{0.38}$, which is close to the theory $C_{27}H_{18}N$. In the empirical formula H is in excess by 2.1 and Br remains. Presumably these deviations from the theory are attributed to the state of the structural units at the terminals of the copolymer. The measurement of the molecular weight was impracticable because this copolymer was insoluble in commonly used solvents. Considering from the amounts of H and Br in this copolymer and also from the results of polymerization reactions of resembling compounds, this copolymer is presumed to have 10 to 15 molecules of triphenylamine and linking benzene molecules.

Using the copolymer prepared in Example 2 in place of the polymer of Example 1, the above described Experiments 1 and 2 were repeated in the same manners.

In Experiment 1, the copolymer was found to be an insulator since the conductivity of the test piece before doping was $7.8 \times 10^{-10}$ S·cm$^{-1}$ at room temperature. When the test piece of the copolymer was exposed to saturated vapor of iodine at room temperature in the absence of air, the conductivity became as high as 0.02 S·cm$^{-1}$ in 24 hr and further increased to 0.04 S·cm$^{-1}$ in 72 hr, and the yellow color of the copolymer changed to black. When the test piece doped with iodine was left in air, it retained high conductivity for a long time though the conductivity decreased to 0.03 S·cm$^{-1}$ in one week and to 0.02 S·cm$^{-1}$ in 40 days. When the test piece was again left exposed to saturated vapor of iodine at room temperature in the presence of air, the conductivity increased to 0.03 S·cm$^{-1}$ in 24 hr and resumed the highest level of 0.04 S·cm$^{-1}$ in 48 hr.

In Experiment 2, the repeated measurement of the oxidation-reduction potential in nitrogen gas atmosphere gave a cyclic voltamogram almost identical with that of FIG. 4. The oxidation-reduction potential of the tested copolymer was about 0.97 V. The result of the repeated measurement in air was almost identical with the cyclic voltamogram of FIG. 5. Accordingly, the tested copolymer electrode can be said to be very stable to repetition of oxidation and reduction.

EXAMPLE 3

First, metallic magnesium was formed by reaction between 0.8 g of metallic potassium and 0.95 g of magnesium chloride in 50 ml of tetrahydrofuran in the same manner as in Example 1.

In this example, 3.1 g (0.01 mole) of 4,4'-dichlorotriphenylamine was used in place of 4,4',4''-tribromotriphenylamine in Example 1. Otherwise the polymerization and purification process of Example 1 was performed identically except that the duration of purification by a Soxhlet's extractor was shortened to 5 hr. The product was a polymer in the form of a yellowish white powder, which weighed 1.7 g in dry state.

The polymer of Example 3 melted at 200°–250° C. and was almost completely soluble in hot chloroform. By the gel permeation chromatography method using polystyrene gel, the number average molecular weight of this polymer was measured to be 2500–3000. Elementary analysis of this polymer gave the following result: Carbon 77.92%, Hydrogen 4.71% and Nitrogen 4.75%. This analytical result gives an empirical formula $C_{19.1}H_{13.8}N$, which is close to the theory $C_{18}H_{13}N$.

Figure 7:
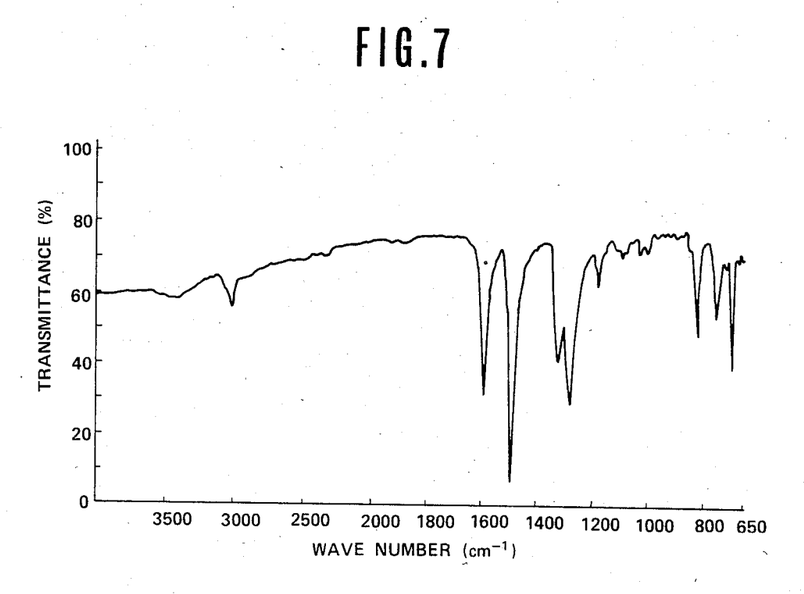
FIGS. 7, 10 and 13 show infrared absorption spectra of three polymers prepared as third, fourth and fifth examples of the invention, respectively.
Figure 8:
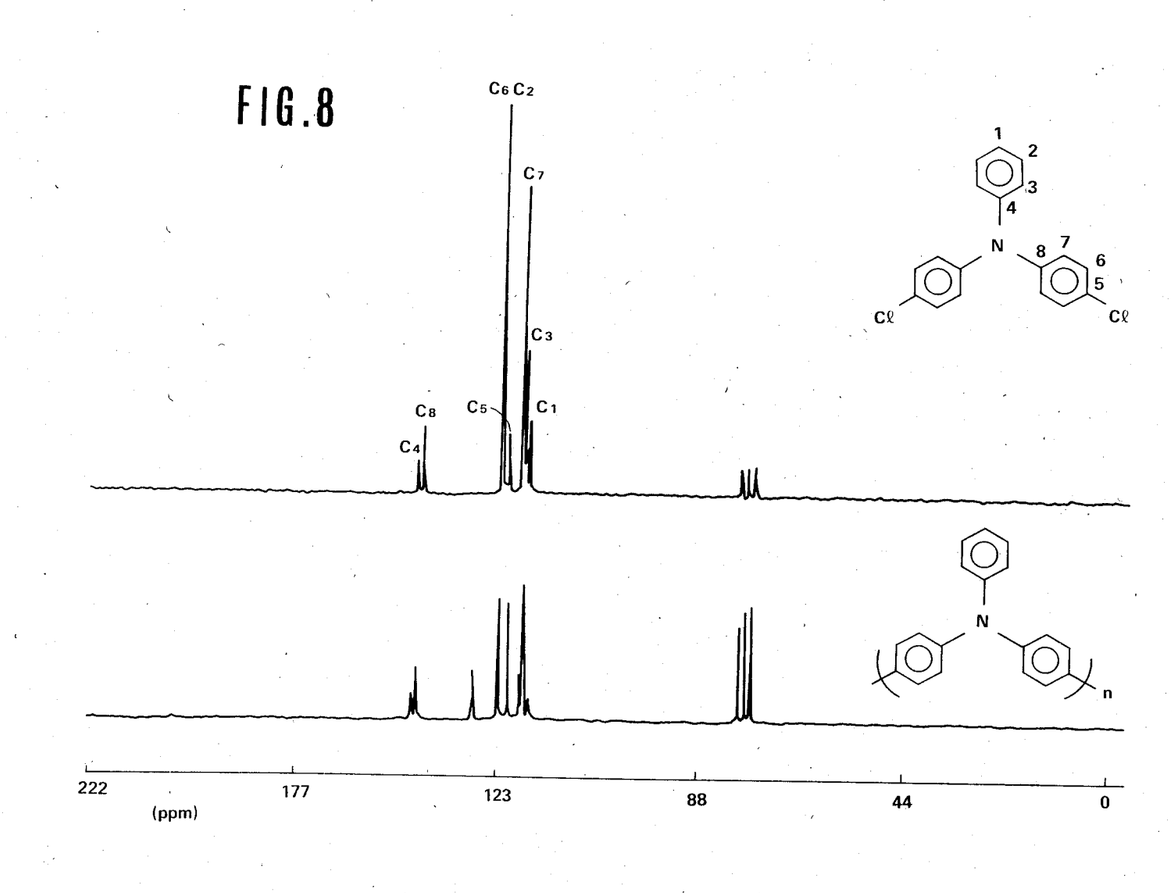
FIG. 8 shows the results of NMR analysis of the polymer as the third example of the invention and the starting monomer.

FIG. 7 shows the infrared absorption spectrum of this polymer. The absorption peaks at or near to 1600 cm$^{-1}$, 1490 cm$^{-1}$, 1320 cm$^{-1}$ and 1280 cm$^{-1}$ are attributed to the triphenylamine structure, and the absorption peak at about 820 cm$^{-1}$ is attributed to para-substituted benzene ring. Both 4,4'-dichlorotriphenylamine used as the starting material and the obtained polymer were subjected to analysis by nuclear magnetic resonance (NMR) spectroscopy. The results are shown in FIG. 8.

From the above described analytical results, the polymer obtained in Example 3 was confirmed to be poly(4,4'-triphenylamine).

EXPERIMENT 3

Poly(4,4''-triphenylamine) obtained in Example 3 was dissolved in hot chloroform, and the solution was applied to a glass substrate by spinning and dried to obtain a sample coated with a polymer film which had a thickness of 800 Å. At room temperature (24° C.), this sample was placed in a vessel in which air and saturated vapor of iodine were coexisting and was kept confined in the vessel for 15 hr to thereby dope the polymer film with iodine. After that the conductivity of the doped polymer film was measured by the two-probe method. The measurement was 1.15 S·cm$^{-1}$. This sample was left standing in air for a long period of time to allow de-doping, and was again doped with iodine by the above described method. As the result, the conductivity reverted to 1.15 S·cm$^{-1}$. That is, the polymer film did not undergo deterioration during exposure to air.

EXPERIMENT 4

The solution of poly(4,4'-triphenylamine) in chloroform was spun onto a glass substrate coated with a transparent electrode film, and the sample was heated at 180° C. for 3 hr in a vacuum oven to thereby form a 1000 Å thick film of the polymer on the transparent electrode film.

Figure 9:
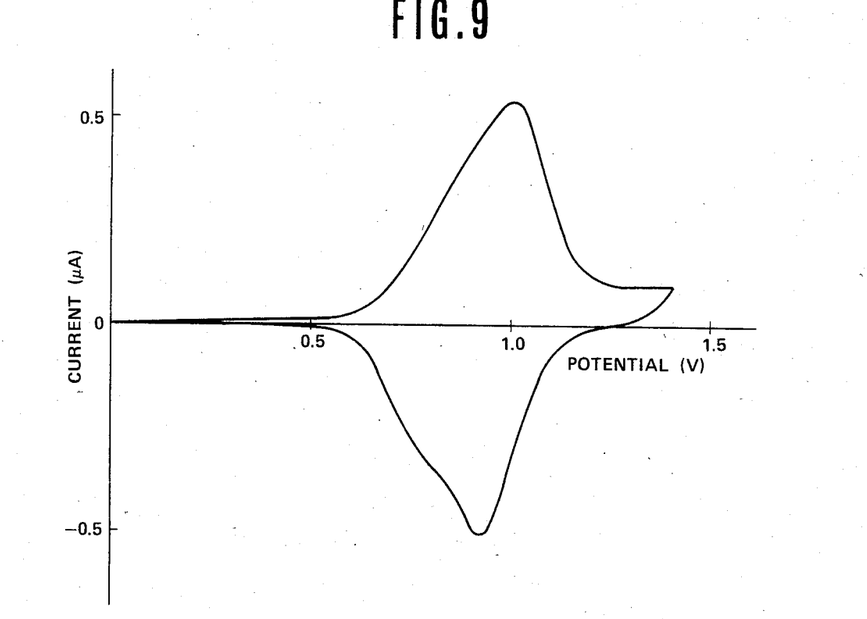
FIGS. 9, 12 and 15 show voltamograms obtained in experiments on polymers as the third, fourth and fifth examples of the invention, respectively.

The polymer film was tested as an electrode in an electrolyte liquid prepared by dissolving 1 mole of lithium perchlorate in 1 liter of propylene carbonate. A platinum wire was used as the counter electrode and Ag/AgCl electrode as the reference electrode. An oxidation-reduction potential of the polymer electrode was measured by cyclically varying the electrode potential at a constant rate of 10 mV/sec. The test was conducted in the atmosphere. FIG. 9 shows a voltamogram obtained in this experiment. As can be seen, the oxidation-reduction potential of the tested polymer electrode was about 0.97 V.

EXAMPLE 4

First, metallic magnesium was formed by reaction between 0.8 g of metallic potassium and 0.95 g of magnesium chloride in 50 ml of tetrahydrofuran in the same manner as in Example 1.

In this example, 3.2 g (0.01 mole) of 4,4'-dibromo-(4"-methyl)triphenylamine was used in place of 4,4'-dichlorotriphenylamine in Example 3. Polymerization of this monomer and purification of the product were accomplished by the same process as in Example 3. The product was a polymer in the form of a yellowish white powder, which weighed 1.9 g in dry state.

Figure 10:
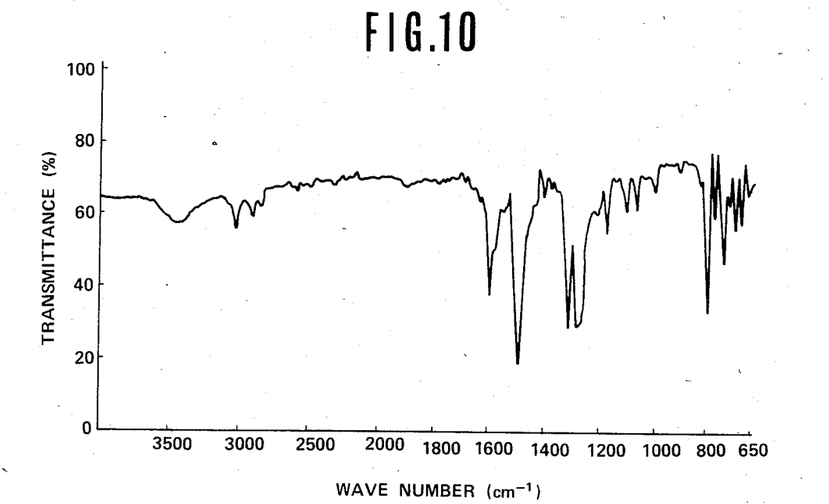
Figure 11:
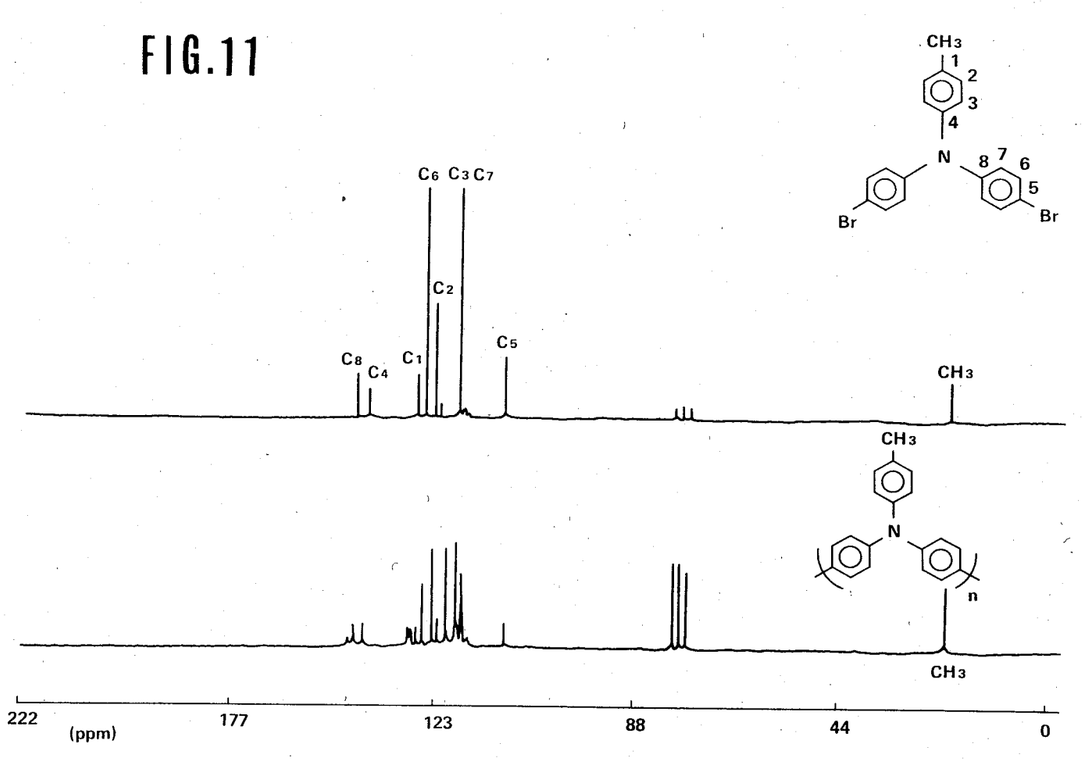
FIGS. 11 and 14 show the same matter with respect to the polymers as the fourth and fifth examples of the invention, respectively.

The polymer of Example 4 melted at 200°–250° C. and was almost completely soluble in hot chloroform. By the gel permeation chromatography method the number average molecular weight of this polymer was measured to be 2500–3000. Elementary analysis of this polymer gave the following result: Carbon 87.95%, Hydrogen 5.53% and Nitrogen 5.49%. This analytical result gives an empirical formula $C_{18.6}H_{14.1}N$, which is close to the theory $C_{19}H_{15}N$. FIG. 10 shows the infrared absorption spectrum of this polymer. Both 4,4'-dibromo-(4"-methyl)triphenylamine used as the starting monomer and the obtained polymer were subjected to analysis by NMR spectroscopy. The results are shown in FIG. 11. From these analytical results, the polymer obtained in Example 4 was confirmed to be poly(4,4'(-4"-methyl)triphenylamine).

The polymer of Example 4 was dissolved in hot chloroform, and the solution was spun onto a glass substrate and dried to thereby form a polymer coating film having a thickness of 500 Å. At room temperature, the polymer film was exposed to saturated vapor of iodine in the presence of air by the same method as in Experiment 3. After 10 min, the conductivity of the iodine doped polymer film was measured to be 0.05 S·cm$^{-1}$. This sample was left standing in air to allow de-doping, and was again exposed to saturated vapor of iodine in the presence of air. As the result, the conductivity reverted to 0.05 S·cm$^{-1}$. That is, the polymer film did not undergo deterioration during exposure to air.

Figure 12:
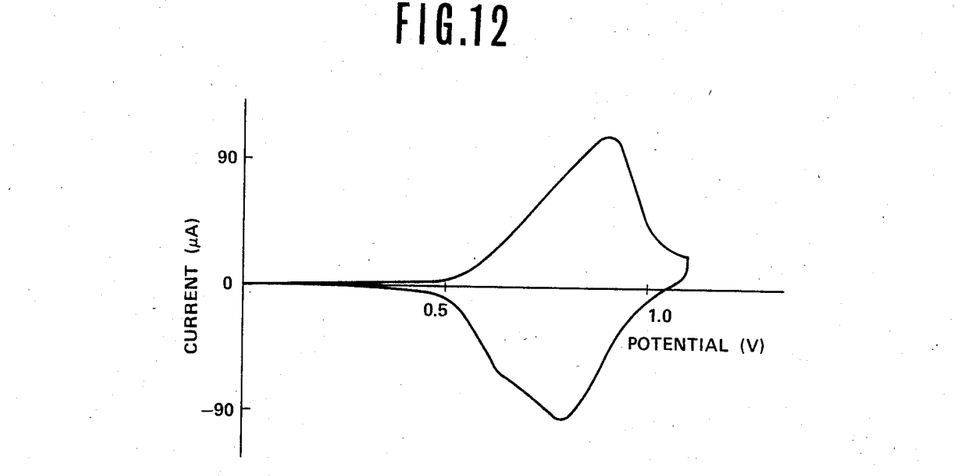

To conduct the above described Experiment 4 on poly(4,4'(4"-methyl)triphenylamine) prepared in Example 4, a solution of the polymer in chloroform was spun onto a glass substrate coated with a transparent electrode film. The sample was heated at 180° C. for 3 hr in a vacuum oven to thereby complete a polymer electrode in the form a film having a thickness of 800 Å. This polymer electrode was tested by the same method as in Experiment 4. FIG. 12 shows a voltamogram obtained in this experiment. As can be seen, the oxidation-reduction potential of the tested polymer electrode was about 0.85 V.

EXAMPLE 5

First, metallic magnesium was formed by reaction between 0.8 g of metallic potassium and 0.95 g of magnesium chloride in 50 ml of tetrahydrofuran in the same manner as in Example 1.

In this example, 3.4 g (0.01 mole) of 4,4'-dibromo(4"-methoxy)triphenylamine was used as the starting monomer. The polymerization of this monomer and purification of the product were accomplished by the same process as in Example 3. The product was a polymer in the form of a yellowish white powder, which weighed 2.0 g in dry state.

Figure 13:
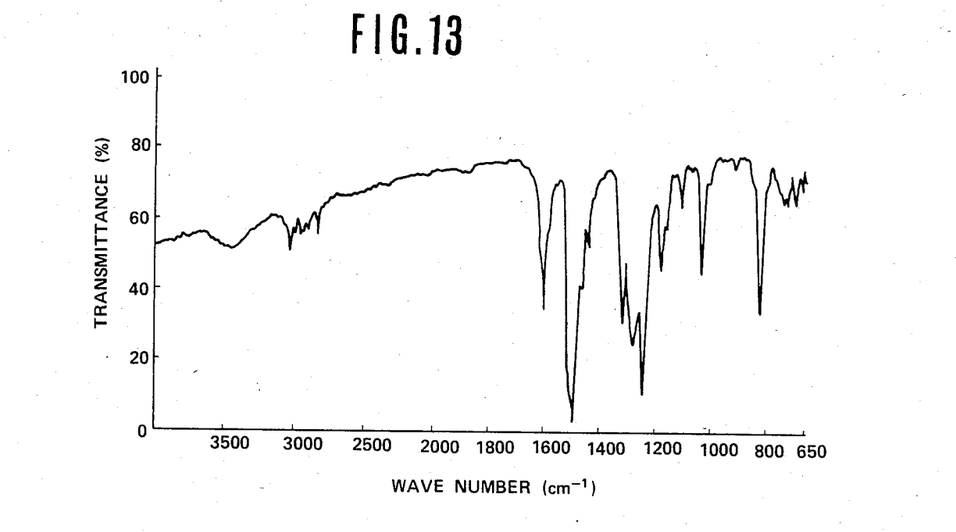
Figure 14:
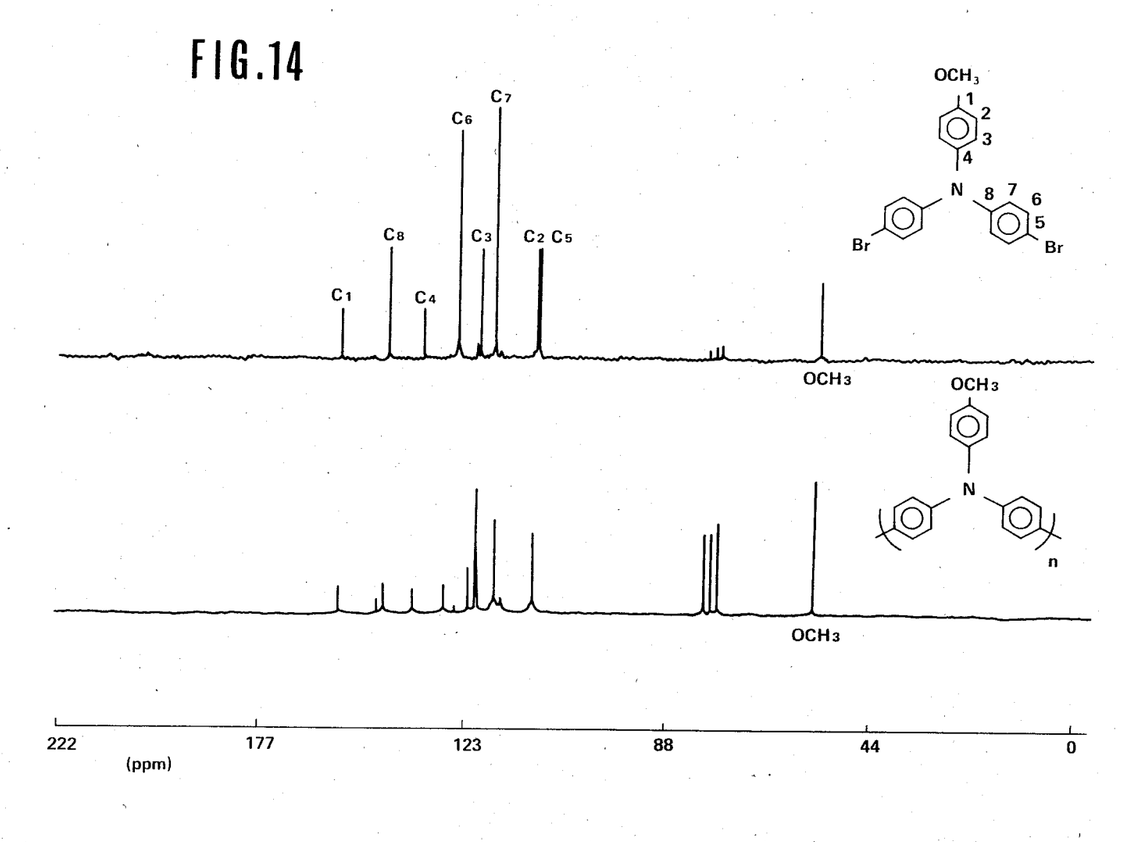

The polymer of Example 5 melted at 200°–250° C. and was almost completely soluble in hot chloroform. By the gel permeation chromatography method the number average molecular weight of this polymer was measured to be about 5000. Elementary analysis of this polymer gave the following result: Carbon 76.27%, Hydrogen 4.97%, Nitrogen 4,33%, Halogen 9.82% and other component 4.51%. Assuming that the other component is entirely oxygen, the analytical result gives an empirical formula $C_{20.6}H_{16.1}NO_{0.91}$, which is close to the theory $C_{19}H_{15}NO$. FIG. 13 shows the infrared absorption spectrum of this polymer. Both 4,4'-dibromo-(4"-methoxy)triphenylamine used as the starting monomer and the obtained polymer were subjected to analysis by NMR spectroscopy. The results are shown in FIG. 14. From these analytical results, the polymer obtained in Example 5 was confirmed to be poly(4,4'(-4"-methoxy)triphenylamine).

The polymer of Example 5 was dissolved in hot chloroform, and the solution was spun onto a glass substrate and dried to thereby form a polymer coating film having a thickness of 500 Å. At room temperature, the polymer film was doped with iodine by the same method as in the case of testing the polymer of Example 4. The conductivity of the doped polymer film was 3.3 S·cm$^{-1}$. This sample was left standing in air to allow de-doping, and was again exposed to saturated vapor of iodine in the presence of air. As the result, the conductivity reverted to 3.3 S·cm$^{-1}$. That is, the polymer film did not undergo deterioration during exposure to air.

Figure 15:
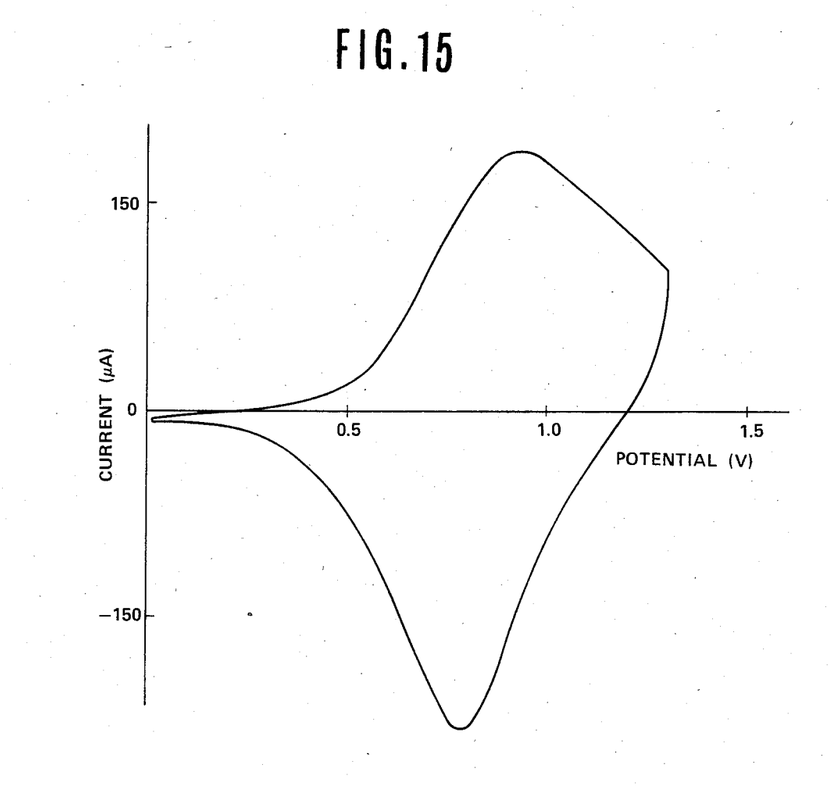

To test the polymer of Example 5 as an electrode material, a solution of the polymer in chloroform was spun onto a glass substrate coated with a transparent electrode film and heated at 180° C. for 3 hr to thereby complete a polymer electrode in the form of film having a thickness of 800 Å. This polymer electrode was tested by the same method as in Experiment 4. In this case, however, the electrode potential was varied at a rate of 20 mV/sec. FIG. 15 shows a voltamogram obtained in this experiment. As can be seen, the oxidation-reduction potential of the tested polymer electrode was about 0.85 V.

What is claimed is:

1. A polymer comprising structural units represented by the formula (I):

2. A polymer according to claim 1, wherein said structural units are directly linked with one another so as to form a homopolymer.

3. A polymer according to claim 1, further comprising second structural units represented by the formula (II):

4. A polymer according to claim 3, wherein said structural units of the formula (I) and said second structural units are alternately linked with one another so as to form an alternating copolymer.

5. A polymer comprising structural units represented by the formula (III):

wherein R represents a hydrogen atom, an alkyl group having 1 to 4 carbon atom(s) or an alkoxyl group having 1 to 4 carbon atom(s).

6. An electroconductive polymeric material comprising a polymer according to claim 1 and an electron accepting dopant.

7. An electroconductive polymer material comprising a polymer according to claim 5 and an electron accepting dopant.